(12) United States Patent
Heinonen et al.

(10) Patent No.: US 6,768,714 B1
(45) Date of Patent: Jul. 27, 2004

(54) METHODS AND APPARATUS FOR USE IN OBTAINING FREQUENCY SYNCHRONIZATION IN AN OFDM COMMUNICATION SYSTEM

(75) Inventors: Jari M. Heinonen, Seattle, WA (US); Michael R. Hirano, Redmond, WA (US); Steven E. McMeekin, Nederland, CO (US)

(73) Assignee: AT&T Wireless Services, Inc., Redmond, WA (US)

(*) Notice: Subject to any disclaimer, the term of this patent is extended or adjusted under 35 U.S.C. 154(b) by 799 days.

(21) Appl. No.: 09/594,886

(22) Filed: Jun. 14, 2000

Related U.S. Application Data

(60) Provisional application No. 60/140,990, filed on Jun. 23, 1999.

(51) Int. Cl.[7] .............................. H04J 11/00; H04J 1/00; H04J 3/06
(52) U.S. Cl. ...................... 370/208; 370/343; 370/503; 375/364
(58) Field of Search .............................. 370/206, 208, 370/210, 343, 344, 480, 504, 507, 503; 375/147, 349, 344, 326, 354, 375, 364

(56) References Cited

U.S. PATENT DOCUMENTS

| | | | |
|---|---|---|---|
| 3,795,772 A | 3/1974 | Hill et al. ............... 179/15 BS |
| 4,689,806 A | 8/1987 | von der Embse ............ 375/111 |
| 4,849,991 A | 7/1989 | Arnold et al. ................ 375/84 |
| 5,170,415 A | 12/1992 | Yoshida et al. ............... 375/80 |
| 5,345,440 A | 9/1994 | Gledhill et al. ............... 370/19 |
| 5,471,464 A | 11/1995 | Ikeda .......................... 370/19 |
| 5,565,764 A | 10/1996 | Priebe et al. ............ 324/76.21 |
| 5,596,582 A | 1/1997 | Sato et al. .................. 370/509 |
| 5,602,835 A | 2/1997 | Seki et al. .................. 370/206 |
| 5,652,772 A | 7/1997 | Isaksson et al. ............ 375/367 |
| 5,694,389 A | 12/1997 | Seki et al. .................. 370/208 |
| 5,732,113 A | 3/1998 | Schmidl et al. ............. 375/355 |
| 5,790,784 A | 8/1998 | Beale et al. ........... 395/200.01 |
| 5,812,523 A | 9/1998 | Isaksson et al. ............ 370/208 |
| 5,912,876 A | 6/1999 | H'mimy ..................... 370/210 |
| 5,933,421 A | 8/1999 | Alamouti et al. ........... 370/330 |
| 5,946,292 A | 8/1999 | Tsujishita et al. ........... 370/204 |
| 5,953,311 A | 9/1999 | Davies et al. ............... 370/210 |
| 5,959,965 A | 9/1999 | Ohkubo et al. ............. 370/203 |
| 6,028,900 A | 2/2000 | Taura et al. |
| 6,363,084 B1 * | 3/2002 | Dejonghe ................... 370/480 |
| 6,487,252 B1 * | 11/2002 | Kleider et al. .............. 375/260 |
| 6,574,292 B2 * | 6/2003 | Heinonen et al. ........... 375/345 |

OTHER PUBLICATIONS

Speth, Michael, *OFDM Receivers for Broadband–Transmission*, OFMD, http://www.ert.rwth–aachen.de/Projekte/Theo/OFDM/www_ofdm.html . . . node1.html through node9.html, May 1999, pp. 1–16.

(List continued on next page.)

*Primary Examiner*—Duc Ho
(74) *Attorney, Agent, or Firm*—Incaplaw; Terrance A. Meador

(57) ABSTRACT

A frequency correction process involves the steps of generating a plurality of tone values for a plurality of tone bins, where the plurality of tone bins includes a first set of tone bins assigned to a first frequency range and a second set of tone bins assigned to a second frequency range; performing complex conjugate multiplication between the tone values of the first and the second sets of tone bins; identifying a maximum value from results of the complex conjugate multiplication; and shifting receiver frequency based on a location of the maximum value relative to a predetermined pilot tone location. In this method, the first frequency range corresponds to a lower edge portion of a frequency band of interest, an upper edge portion of a lower adjacent frequency band, and a lower guard band in between the lower and the upper edge portions; and the second frequency range corresponds to an upper edge portion of the frequency band of interest, a lower edge portion of an upper adjacent frequency band, and an upper guard band in between the upper and lower edge portions.

20 Claims, 12 Drawing Sheets

OTHER PUBLICATIONS

Author unknown, *OFDM System—Description*, http://www.sce.carleton.ca/~Laszlo.Hazy/OFDM/fig21dsc.html, date unknown, pp. 1–4.

Linnartz, Jean–Paul, et al, *Special Issue on "Multi–Carrier Modulation"*, Wireless Personal Communication, Kluwer, No. 1–2, 1996, http://diva.eecs.berkeley.edu/~linnartz/issue-.html, pp. 1–8.

Author unknown, *What is OFDM?*, http://www.sm.luth.se/csee/sp/projects/ofdm/ofdm.html, date unknown, 2 pgs.

Author unknown, *Orthogonal frequency division multiplexing (OFDM)*, http://www.sm.luth.se/csee/sp/projects/ofdm/OLDofdm.html, date unknown, 2 pgs.

Author unknown, *Division of Signal Processing, Syncroniation in OFDM*, Lulea University of Technology, http://www.sm.luth.se/csee/sp/research/synch/index.html, date unknown, pp. 1–3.

Rohling, Hermann, et al, *Broad–Band OFDM Radio Transmission for Multimedia Applications*, Proceedings of the IEEE, vol. 87, No. 10, Oct. 1999, pp. 2–13.

Bingham, John A.C., *Multicarrier Modulation for Data Transmission: An Idea Whose Time Has Come*, IEEE Communications Magazine, May 1990. pp. 1–8.

Lawrey, Eric, *The suitablility of OFDM as a modulation technique for wireless telecommunications, with a CDMA comparison*, http://www.eng.jcu.edu.au/eric/thesis/Thesis.htm . . . chapter1.htm . . . chapter2.htm, Oct. 1997, pp. 1–25.

PCT, International Search Report For PCT/US 00/40232, Mailed Oct. 26, 2000, (6 pgs.).

Classen, Ferdinand et al., "Frequency Synchronization Algorithms for OFDM Systems Suitable for Communication over Frequency Selective Fading Channels", Proceedings of the Vehicular Technology Conference, IEEE, Jun. 8, 1994, vol. 3, pp. 1655–1659.

Oh, Sung Ji, et al., "A Carrier Synchronization Technique for OFDM on the Frequency–Selective Fading Environment", IEEE Vehicular Technology Conference, Apr. 28, 1996, vol. 3, pp., 1574–1578.

Lambrette, Uwe, et al., "OFDM Burst Frequency Synchronization by Single Carrier Training Data", IEEE Communications Letters, Mar. 1997, vol. 1, No. 2, pp. 46–48.

Classen F. et al: "Frequency Synchronization Algorithms For OFDM Systems Suitable For Communication Over Frequency Selective Feding Channels" Proceedings of The Vehicular Technology Conference, IEEE, vol. 3, Jun. 8, 1994 pp. 1655–1659.

Oh J. S. et al: "A Carrier Synchronization Technique For OFDM On The Frequency—Selective Fading Environment", IEEE Vehicular Technology Conference, vol. 3, Apr. 28, 1996, pp. 1574–1578.

Lambrette U. et al: "OFDM Burst Frequency Sychronization By Single Carrier Training Data", IEEE Communications Letters, vol. 1, No. 2, Mar. 2, 1997, pp. 46–48.

\* cited by examiner

Example 1: No freq error

FIG. 18
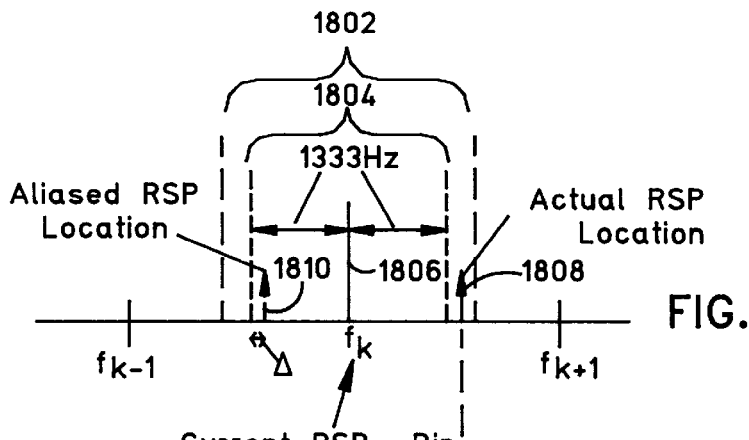
FIG. 18A
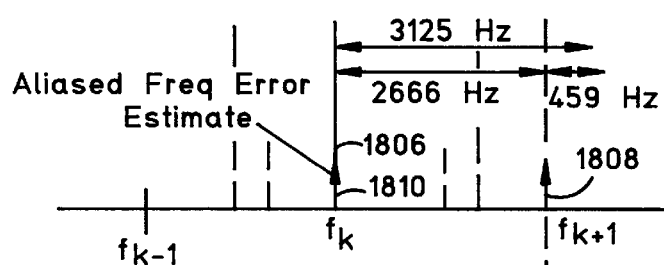
FIG. 18B
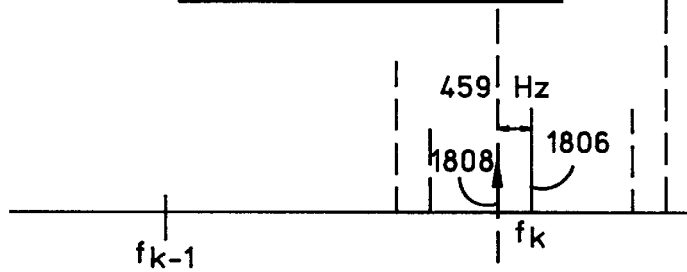
FIG. 18C
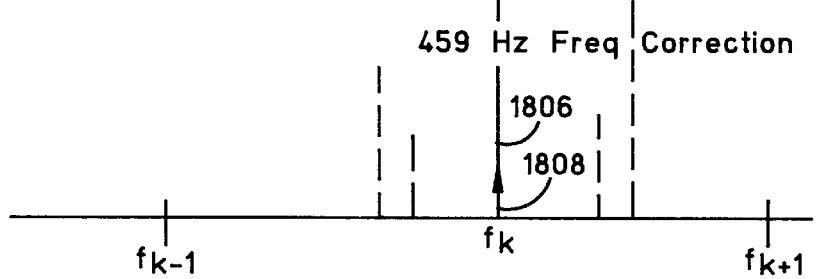
FIG. 18D

US 6,768,714 B1

METHODS AND APPARATUS FOR USE IN OBTAINING FREQUENCY SYNCHRONIZATION IN AN OFDM COMMUNICATION SYSTEM

RELATED APPLICATIONS

This application claims the benefit of U.S. Provisional Application No. 60/140,990, filed Jun. 23, 1999, and entitled "A Noncoherent Frequency Error Estimation Method for an OFDM Communication System," which is incorporated herein in its entirety.

The following applications, assigned to the Assignee of the current invention, and being filed concurrently, contain material related to the subject matter of this application, and are incorporated herein by reference:

J. Heinonen et al., entitled "Methods and Apparatus for Use in Obtaining Frequency Synchronization in an OFDM Communication System," Ser. No. 09/594,890, filed Jun. 14, 2000;

J. Heinonen et al., entitled "Apparatus and Method for Synchronization in a Multiple Carrier Communication System by Observing a Plurality of Synchronization Indicators," Ser. No. 09/593,215, filed Jun. 14, 2000;

J. Heinonen et al., entitled "Apparatus and Method for Synchronization in a Multiple Carrier Communication System by Observing Energy Within a Guard Band," Ser. No. 09/593,449, filed Jun. 14, 2000, now U.S. Pat. No. 6,389,087, issued May 14, 2002; and J. Heinonen et al., entitled "Apparatus and Method for Synchronization in a Multiple Carrier Communication System by Observing a Phase-Frequency Relationship of a Plurality of Pilot Signals," Ser. No. 09/593,547, filed Jun. 14, 2000.

BACKGROUND OF THE INVENTION

1. Field of the Invention

The present invention relates generally to the field of orthogonal frequency division multiplexing (OFDM) communication systems, and more particularly to the field of frequency synchronization in OFDM communication systems.

2. Description of the Related Art

Orthogonal frequency division multiplexing (OFDM) is a robust technique for efficiently transmitting data over a channel. This technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier. Also, OFDM is much less susceptible to inter-symbol interference (ISI) from the use of a guard time between successive bursts.

Although OFDM exhibits several advantages, prior art implementations of OFDM also exhibit several difficulties and practical limitations. The most important difficulty with implementing OFDM transmission systems is that of achieving timing and frequency synchronization between the transmitter and the receiver. In order to properly receive an OFDM signal that has been transmitted across a channel and demodulate the symbols from the received signal, an OFDM receiver must determine the exact timing of the beginning of each symbol within a data frame. Prior art methods utilize a "cyclic prefix," which is generally a repetition of part of a symbol acting to prevent inter-symbol interference (ISI) between consecutive symbols. If correct timing is not known in prior art receivers, the receiver will not be able to reliably remove the cyclic prefixes and correctly isolate individual symbols before computing the FFT of their samples. In this case, sequences of symbols demodulated from the OFDM signal will generally be incorrect, and the transmitted data bits will not be accurately recovered.

Equally important but perhaps more difficult than achieving proper symbol timing is the issue of determining and correcting for carrier frequency offset, the second major aspect of OFDM synchronization. Ideally, the receive carrier frequency, $f.sub.cr$, should exactly match the transmit carrier frequency, $f.sub.ct$. If this condition is not met, however, the mismatch contributes to a non-zero carrier frequency offset, $.DELTA.f.sub.c$, in the received OFDM signal. OFDM signals are very susceptible to such carrier frequency offset which causes a loss of orthogonality between the OFDM sub-carriers and results in inter-carrier interference (ICI) and a severe increase in the bit error rate (BER) of the recovered data at the receiver. In general, prior art synchronization methods are computationally intensive.

Accordingly, there is an existing need to provide alternatives to synchronization in OFDM communication systems. More particularly, there is an existing need to provide alternatives to frequency synchronization that are less computationally intensive than the prior art.

SUMMARY OF THE INVENTION

Methods and apparatus for use in obtaining frequency synchronization in a multicarrier modulated system utilizing a frequency band of orthogonal narrowband carriers are described. The frequency synchronization methods described herein relate to the use of a coarse frequency correction process, a fine frequency correction process, and an overarching iterative process that makes use of both the coarse and fine frequency correction processes. The present invention relates more particularly to the coarse frequency correction process described herein.

The coarse frequency correction process involves the steps of generating a plurality of tone values for a plurality of tone bins, where the plurality of tone bins include a first set of tone bins assigned to a first frequency range and a second set of tone bins assigned to a second frequency range; performing complex conjugate multiplication between the tone values of the first and the second sets of tone bins; identifying a maximum value from results of the complex conjugate multiplication; and shifting receiver frequency based on a location of the maximum value relative to a predetermined pilot tone location. In this method, the first frequency range corresponds to a lower edge portion of a frequency band of interest, an upper edge portion of a lower adjacent frequency band, and a lower guard band in between the lower and the upper edge portions; and the second frequency range corresponds to an upper edge portion of the frequency band of interest, a lower edge portion of an upper adjacent frequency band, and an upper guard band in between the upper and lower edge portions.

BRIEF DESCRIPTION OF THE DRAWINGS

FIGS. 18A, 18B, 18C, and 18D are illustrative graphs which describe an example of the method of FIG. 17.

DETAILED DESCRIPTION OF THE PREFERRED EMBODIMENTS

Figure 1:
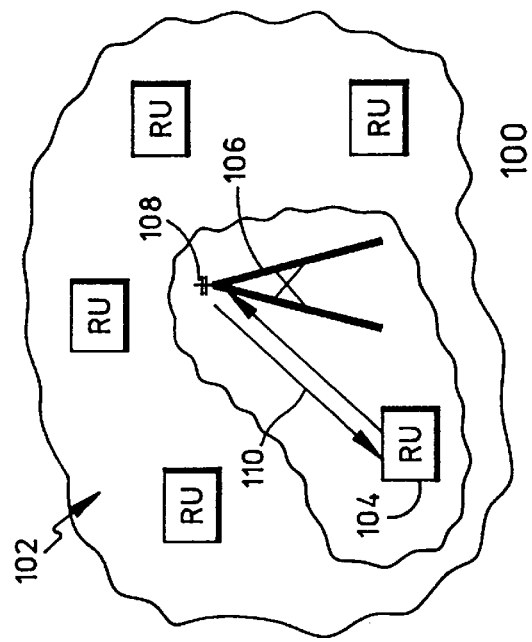
FIG. 1 is an illustrative representation of a wireless communication system, such as a fixed wireless system, utilizing OFDM communication methods.

FIG. 1 is an illustrative representation of a wireless communication system 100 which utilizes orthogonal frequency division multiplexing (OFDM) or OFDM-like communication methodologies. Wireless communication system 100 includes at least one base unit 106 having one or more antennas 108, and a plurality of remote units 102 ("RUs" or "receiver units"), such as remote unit 104. Base unit 106 and remote units 102 communicate via radio frequency (RF) signals, such as RF signals 110 between base unit 106 and remote unit 104. Wireless communication system 100 can make use of a number of different communication techniques, such as frequency division multiplie access (FDMA), time division multiple access (TDMA), or time division duplex (TDD). Preferably, wireless communication system 100 is a fixed wireless system (FWS), where base unit 106 provides telephone and high-speed data communication to each one of a number of fixed-location subscribers equipped with an RU.

Figure 2:
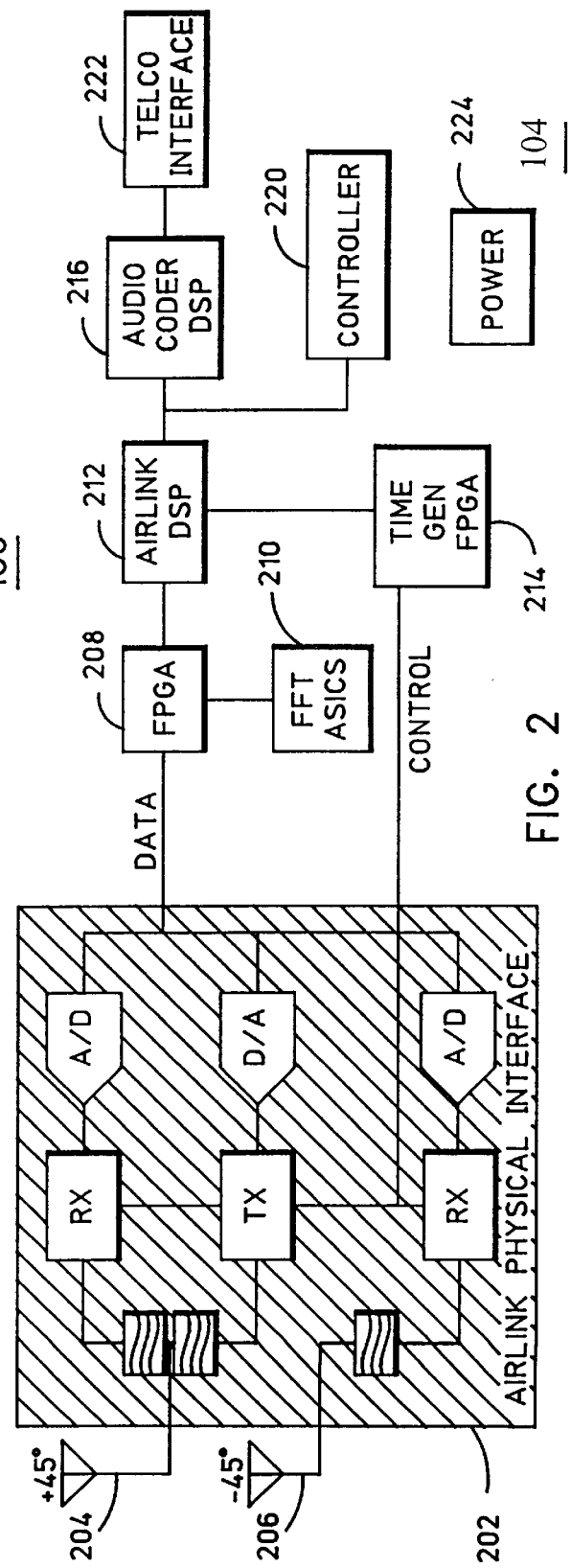
FIG. 2 is a schematic block diagram of a receiver unit of the wireless communication system of FIG. 1.

FIG. 2 is a schematic block diagram of receiver unit 104 of wireless communication system 100. As shown, receiver unit 104 has electronic circuitry which includes diversity antennas 204 and 206 coupled to an airlink physical interface 202, a field programmable gate array (FPGA) 208, two Fast Fourier Transform (FFT) application-specific integrated circuits (ASICs) 210, an airlink digital signal processor (DSP) 212, a time generator FPGA 214, an audio coder DSP 216, a controller 220, a telco interface 222, and power supply circuitry 224. Airlink physical interface 202 has a two-branch radio frequency (RF) receiver with two analog-to-digital (A/D) converters, and a single branch RF transmitter with a digital-to-analog (D/A) converter. FFT ASICs 210 and FPGA 208 provide a frequency-to-time/time-to-frequency domain translation engine for OFDM waveforms. Airlink DSP 212 performs airlink physical layer processing and audio coder DSP performs the OFDM vocoder functions. Time generation FPGA 214 provides a serial time division multiplex (TDM) interface along with hardware support for RF control. Telco inteface 222 has a subscriber link interface circuit to provide an interface to a customer's telephone wiring. Controller 220 provides control for most of these devices, and power supply circuitry 224 provides electrical power for operation of the devices. Preferably, airlink and audio coder DSPs 212 and 216 utilize DSPs provided by Texas Instruments and controller 220 utilizes an MC68360 Quad Integrated Communications Controller (QUICC) CPU provided by Motorola, Inc.

Figure 4:
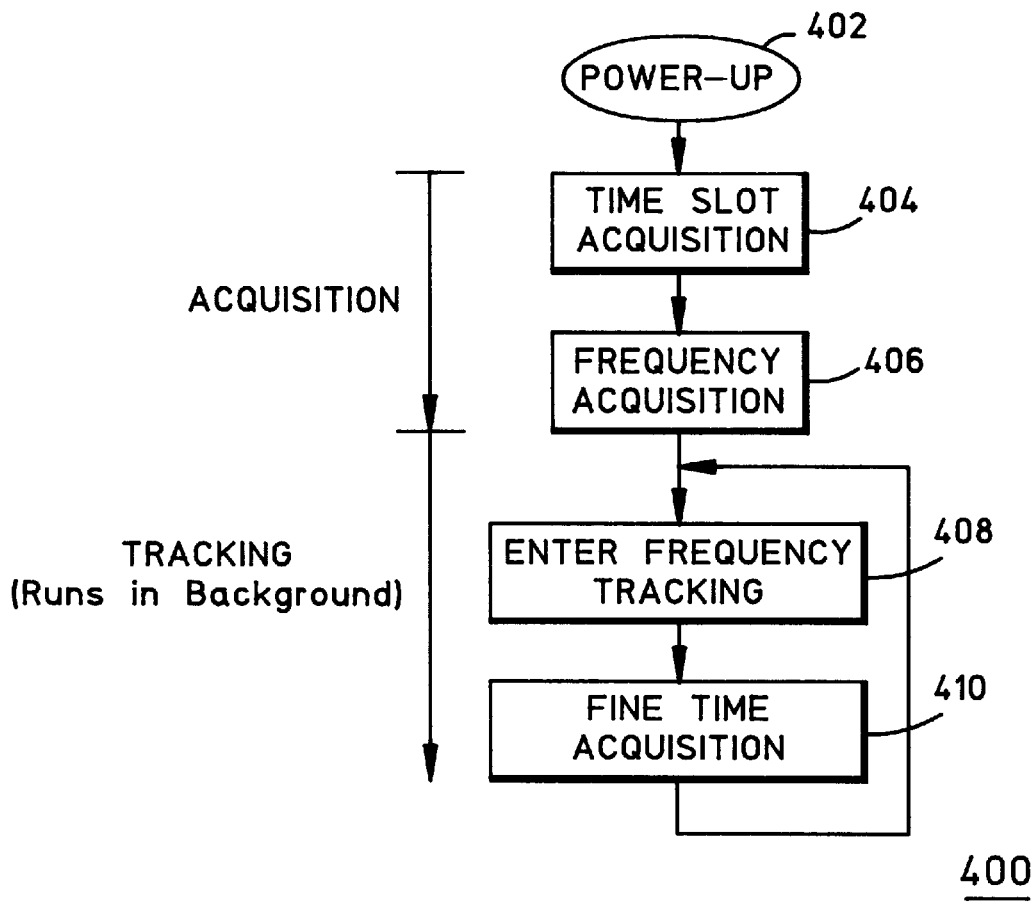
FIG. 4 is a flowchart describing a general method for use in obtaining synchronization in the wireless communication system of FIG. 1.

Referring ahead to FIG. 4, a flowchart 400 describing a general methodology for obtaining synchronization is shown. Following a power up stage (step 402), a receiver unit performs time slot acquisition (step 404). Following the time slot acquisition process, the receiver unit performs a frequency acquisition (step 406). The bulk of frequency and timing errors are eliminated in the "acquisition mode" of steps 404 and 406. After some degree of time and frequency have been found, the receiver unit performs frequency tracking (step 408) and fine time acquisition (step 410). In the "tracking mode" of steps 408 and 410, any residual errors are eliminated on a continual basis. Timeslot acquisition utilizes time samples, whereas the other processes operate in the frequency domain. The present, invention described herein relates to. obtaining frequency synchronization in the context described in relation to the flowchart of FIG. 4 (step 406). In addition to occurring at RU power up, the frequency acquisition process may occur upon a detected loss of lock.

Figure 3:
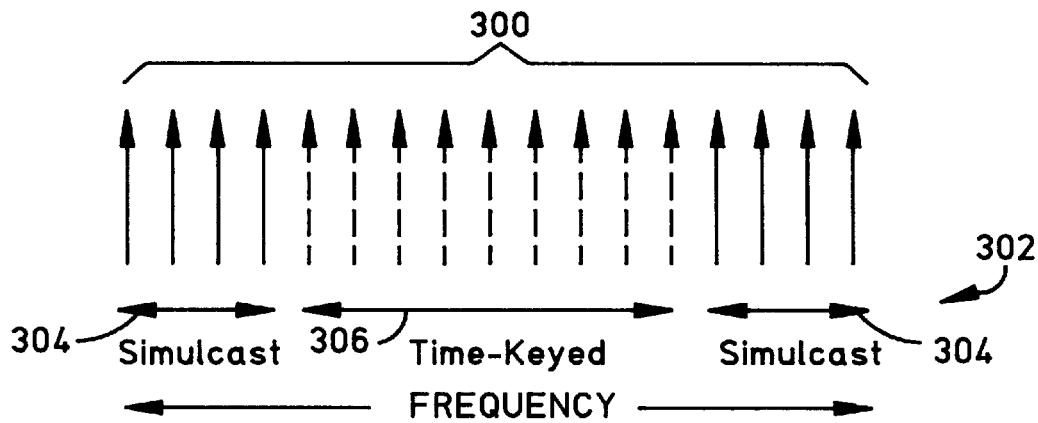
FIG. 3 is an illustrative representation of a set of pilot tones for use in the wireless communication system of FIG. 1.

A set of pilot tones, which may be referred to as RU Synchronization Pilots or RSPs, is utilized to achieve frequency synchronization. Referring back to FIG. 3, an illustrative representation of a set of pilot tones 300 transmitted from a base unit and intended for receipt by a receiver unit are shown. The set of pilot tones 300 includes a set of simulcast pilot tones 302 and a set of time-keyed pilot tones 306. As shown in FIG. 3, the set of simulcast pilot tones 302 are separated in frequency into first and second subsets of simulcast pilot tones 302 and 304. The set of time-keyed pilot tones 306 are positioned in frequency between the first and second subsets 302 and 304. While the set of simulcast pilot tones 302 are broadcast every time slot, the set of time-keyed pilot tones are broadcast once every 1280 time slots (480 milliseconds). In the embodiment shown, there are eight pilot tones in the set of simulcast pilot tones 302 and nine pilot tones in the set of time-keyed pilot tones 306.

Figure 5:
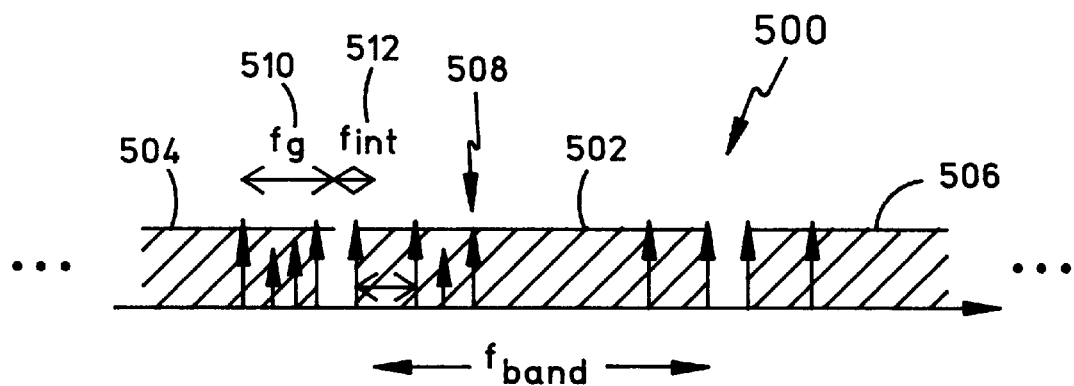
FIG. 5 is an illustrative representation of a set of frequency bands utilized in the wireless communication system of FIG. 1.

FIG. 5 is an illustrative representation of a frequency band having a set of frequency sub-bands 500. For brevity, the frequency sub-bands will be referred to merely as frequency bands. In this embodiment, each one of frequency bands 500 is reserved for the transmission of tones by a single base unit and for reception by a single receiver unit. The set of frequency bands 500 shown in FIG. 5 includes a frequency band of interest 502, a lower adjacent frequency band 504, and an upper adjacent frequency band 506. For clarity, only portions of the lower and upper adjacent frequency bands 504 and 506 are shown. Also, although the frequency bands are shown as having active pilot and traffic tones (indicated by upward-pointing arrows), this is only the case when communication is actually occurring between the base and receiver units. Traffic tones are tones which may bear user voice or data.

Pilot tones and traffic tones are communicated within each one of frequency bands 500. Pilot tones are arranged in frequency as described in relation to FIG. 3, where the simulcast pilot tones are utilized for the frequency synchronization to be described. In FIG. 5, the pilot tones are represented by arrows that are solid and of the same height, while traffic tones (e.g., traffic tones 508) are represented by arrows that are dotted and of varying height. The amplitude and phase of pilot tones remain relatively constant over time, while the amplitude and phase of traffic tones vary over time. Adjacent pilot tones are separated by a frequency gap $f_g$ that is different from a frequency gap $f_{int}$ (i.e., a "guard band") between adjacent frequency bands. For example, two adjacent pilot tones of lower adjacent frequency band 504 are separated by a frequency gap 510, and lower adjacent frequency band 504 and frequency band of interest 502 are separated by a frequency gap 512. As apparent, $f_g > f_{int}$.

In the preferred embodiment, the entire frequency band of FIG. 5 is 5 MHz wide, where each frequency band has a bandwidth $f_{band}$=1 MHz and each tone has a 3125 Hz bandwidth (one FFT tone bin width). The frequency gap $f_g$ between adjacent pilot tones is 56.25 kHz (18 tone bins) and the frequency gap $f_{int}$ between adjacent frequency bands is 46.875 kHz (15 tone bins). In addition, eighteen traffic tones (18 tone bins) are positioned in between adjacent pilot tones.

One objective in frequency synchronization is to eliminate sufficient error so that a frequency tracking mechanism (e.g., a phase-locked loop (PLL)) can lock in a minimal amount of time. The frequency synchronization process described herein includes a coarse frequency synchronization process and a fine frequency synchronization process, executed in an iterative fashion. In the preferred coarse frequency synchronization process described, receiver frequency is corrected to within a predetermined frequency range corresponding to single tone bin. In the preferred fine frequency synchronization process described, receiver frequency is corrected so that a received pilot tone is substantially aligned with a predefined pilot tone reference within the predetermined frequency band. In the preferred embodiment, one FFT bin width is equal to 3125 Hz, the coarse frequency correction process is operative to reduce any error exceeding 3125 Hz (a single tone bin), and the fine frequency correction process is operative to reduce any residual error less than or equal to one-half of 3125 Hz (one-half of a tone bin). The present invention relates more particularly to the coarse frequency correction process described herein.

Figure 6:
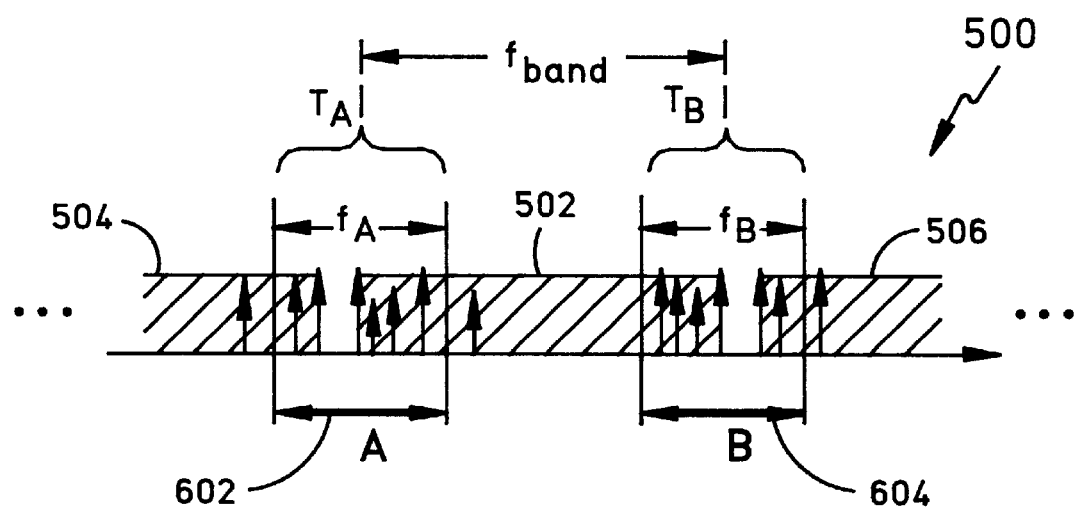
FIG. 6 is an illustrative representation of the set of frequency bands of FIG. 5, where frequency alignment ranges are defined for use in a coarse frequency correction process.
Figure 7:
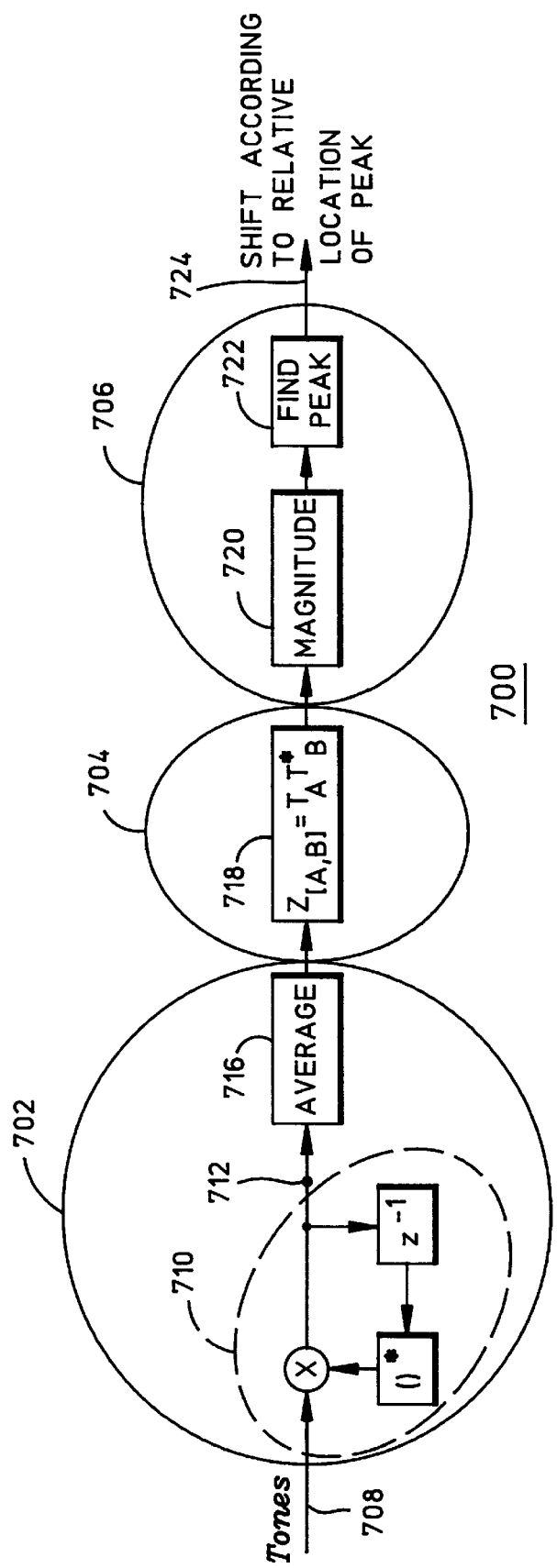
FIG. 7 is a block diagram representation of functional components for use in the coarse frequency correction process.

FIGS. 6–12 are drawings that relate to the coarse frequency synchronization process. FIG. 6 is, more particularly, an illustrative representation of the set of frequency bands 500 of FIG. 5, where "frequency alignment ranges" defined for use in the coarse frequency synchronization process are shown. A frequency alignment range 602 (also denoted by the letters A and $T_A$) corresponds to a lower edge of the frequency band of interest 502. A frequency alignment range 604 (also denoted by the letters B and $T_B$) corresponds to an upper edge of the frequency band of interest 502. Frequency alignment range 602 may be referred to as the lower frequency alignment range and frequency alignment range 604 may be referred to the upper frequency alignment range. Frequency alignment range 602 corresponds to a lower edge portion of the frequency band of interest 502, an upper edge portion of lower adjacent frequency band 504, and the guard band in between those portions. Similarly, frequency alignment range 604 covers an upper edge portion of the frequency band of interest 502, a lower edge portion of upper adjacent frequency band 506, and the guard band in between those portions.

Each frequency range of importance, such as frequency band of interest 502 and frequency alignment ranges 602 and 604, is associated with a set of tone bins that stores tone values generated from received tones that are believed to be within that frequency range. For example, a primary set of tone bins or tone values in the DSP is assigned to what is believed to be frequency band of interest 502, a first set of tone bins or tone values in the DSP is assigned to what is believed to be frequency alignment range 602, and a second set of tone bins or tone values in the DSP is assigned to what is believed to be frequency alignment range 604. As apparent, the tone bins assigned to frequency alignment ranges 602 and 604 overlap with the tone bins assigned to frequency band of interest 502. Only when frequency is correctly synchronized does a set of tone bins assigned to a frequency range actually correspond to tone values from tones received within that frequency range. When frequency is not synchronized, the set of tone bins assigned to the frequency range does not store tone values corresponding to that frequency range, but rather a shifted set of tone bins stores those tone values. An important object of the coarse frequency correction process is to correctly align a set of tone bins with frequency band of interest 502.

Being predefined and fixed during synchronization, frequency alignment ranges 602 and 604 of FIG. 6 are sized $f_A$ and $f_B$ to accommodate a maximum allowable frequency error. In the embodiment described, $f_A$ and $f_B$ are each the same size, 175 kHz, to tolerate a maximum error of 87.5 kHz. The centers of the frequency alignment ranges 602 and 604 are separated by spacing that is equal to the spacing between the outermost pilot tones selected for frequency synchronization. Where the selected pilot tones are positioned on the outermost edge of the frequency band of interest, as in the described embodiments, the centers of frequency alignment ranges 602 and 604 are separated by spacing that is equal to the bandwidth of the frequency band of interest, $f_{band}$. Frequency alignment ranges 602 and 604 also have a pilot tone reference associated therewith. The location of the pilot tone reference is predefined within frequency alignment ranges 602 or 604. In the embodiment described, the pilot tone reference location is in the center of a frequency alignment range. More particularly, a tone bin corresponding to a center of the frequency alignment range is assigned as the pilot tone reference location.

Figure 8A:
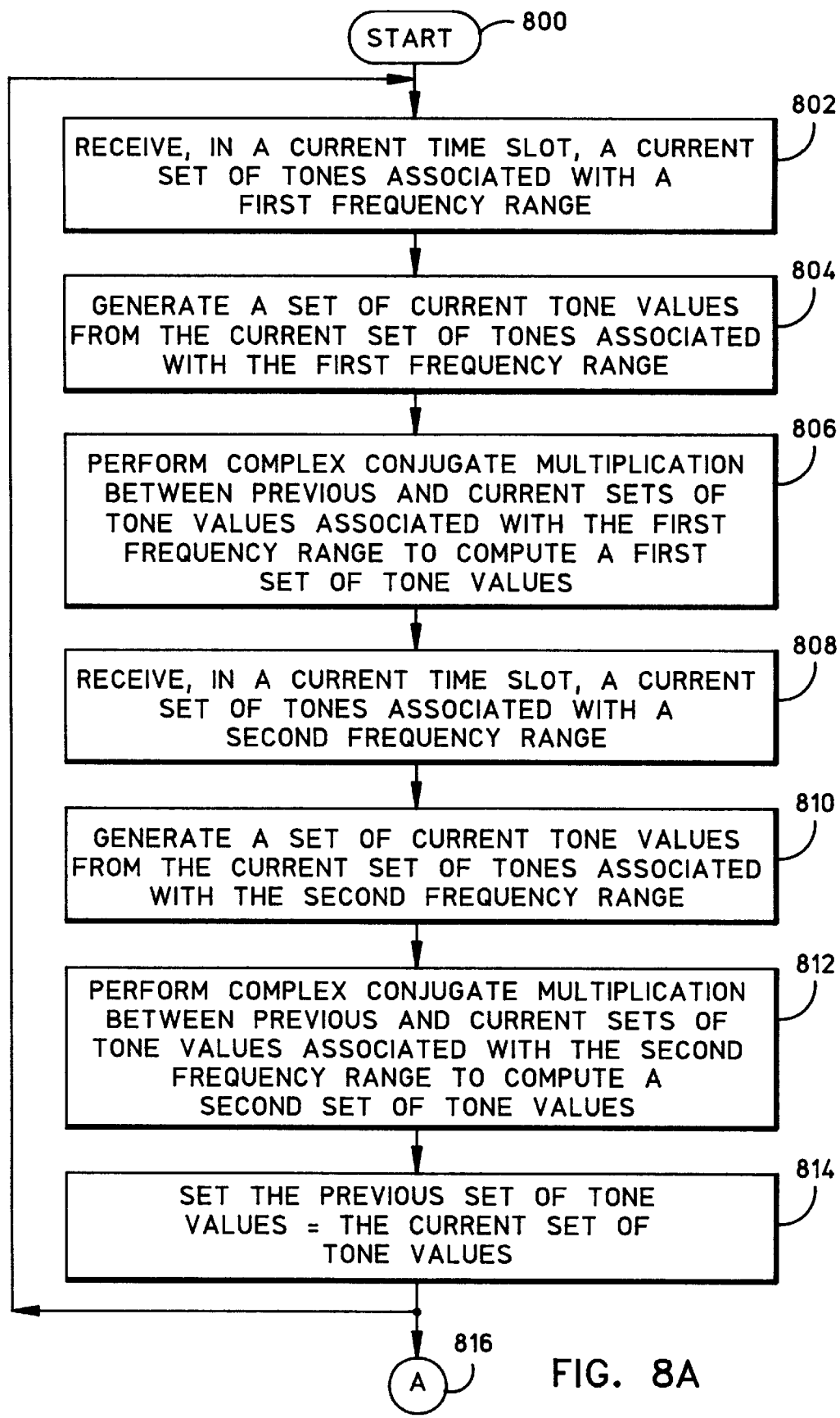
FIGS. 8A and 8B form a flowchart which describes a method for use in obtaining frequency synchronization and, more particularly, the coarse frequency correction process.
Figure 8B:
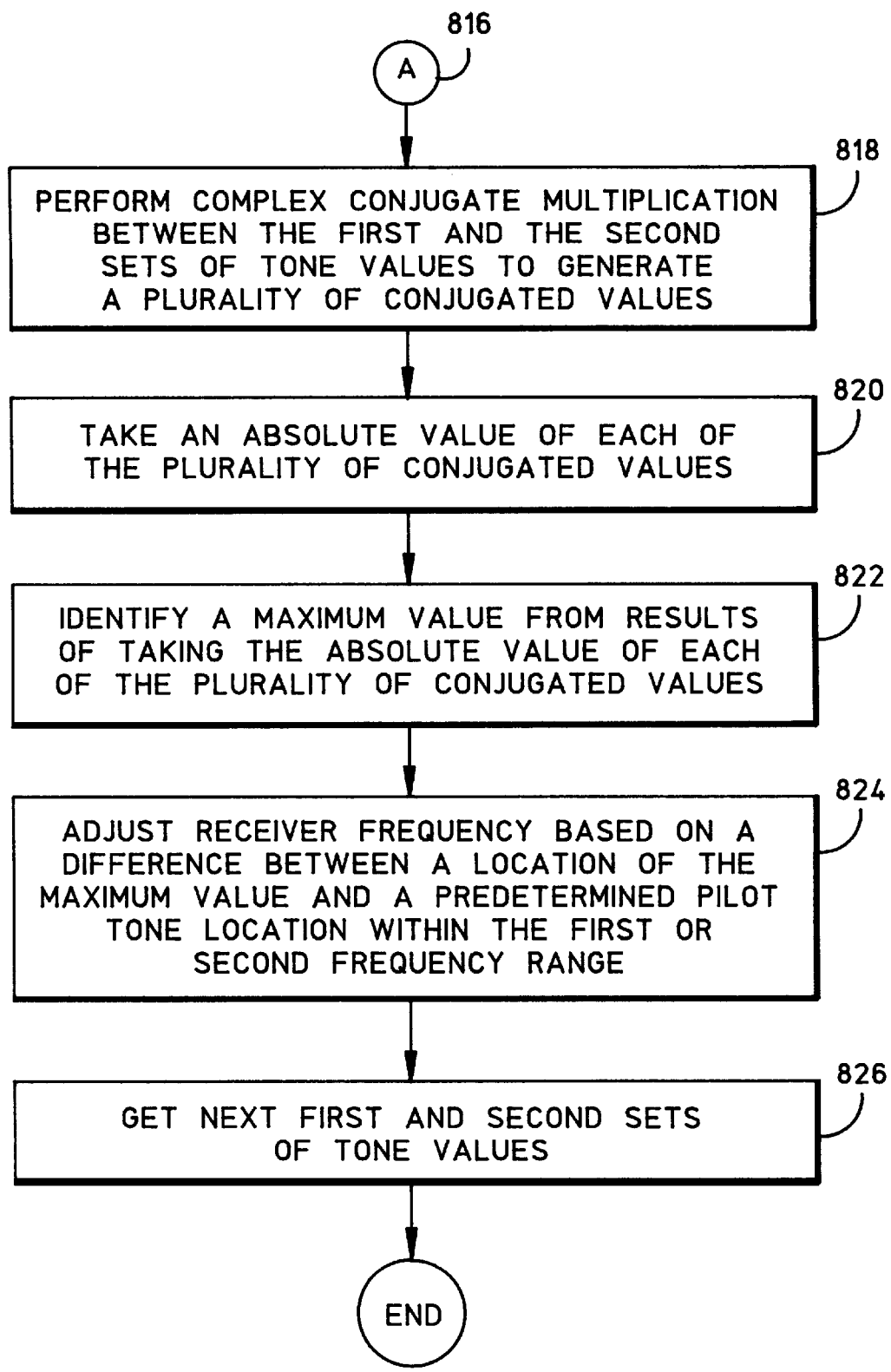

Reference will now be made to FIGS. 8A and 8B which are flowcharts that describe a method for use in obtaining frequency synchronization in an OFDM communication system. More particularly, FIGS. 8A and 8B describe a method for use in obtaining coarse frequency synchronization. The method is performed after time has been adjusted to place, the OFDM waveform inside the appropriate processing interval.

Beginning at a start block 800 of FIG. 8A, a current set of tones associated with a first frequency range is received in a current time slot (step 802). The current set of tones received includes those tones associated with a lower edge portion of a frequency band of interest, such as frequency alignment range 602 of FIG. 6. A set of current tone values is generated from the current set of tones and stored in a first set of tone bins (step 804). Next, complex conjugate multiplication is performed between a previous set of tone values and the current set of tone values from the first set of tone bins, to thereby compute a first set of tone values (step 806). The previous set of tone values are tone values that were generated from a set of tones received in a previous time slot for the first frequency range. By performing this process, tones associated with the first frequency range that vary in phase over time (i.e., traffic tones) are suppressed.

Continuing with the flowchart of FIG. 8A, processes similar to steps 802–806 are applied in steps 808–812 to an upper edge portion of the frequency band of interest, such as frequency alignment range 604 of FIG. 6. These steps may be performed substantially at the same time as steps 802–806. A current set of tones associated with a second frequency range is received in a current time slot (step 808). The current tones received include those tones associated with an upper edge portion of the frequency band of interest, such as frequency alignment range 604 of FIG. 6. A set of current tone values is generated from the current set of tones and stored in a second set of tone bins (step 810). Next, complex conjugate multiplication is performed between a previous set of tone values and the current set of tone values, to thereby compute a second set of tone values (step 812). The previous set of tone values are tone values that were generated from a set of tones received in a previous time slot for the second frequency range. By performing this process, tones of the second frequency range that vary in phase over time (i.e., traffic tones) are suppressed. The current sets of tone values then become the previous sets of tone values (step 814), and the method repeats starting again at step 802. The results of the method (i.e., first and second sets of tone values associated with the first and second frequency ranges, respectively) are passed through a connector 816 to the flowchart of FIG. 8B.

In the preferred embodiment, results from step 806 and results from step 812 of FIG. 8A are averaged over some predetermined time interval to generate the first and the second sets of tone values. Basically, the averaging is a filtering function. More particularly, the results from steps 806 and 812 are averaged over multiple time slots to mitigate the effects of fading. For example, the averaging, may be performed over 50–100 time slots. Although many suitable techniques may be utilized, an equation below describes one way in which averaging may be performed:

$$X_{(k,i)} = (\alpha-1) y_{(k,i)}{}^* y_{(k-1,i)} + \alpha X_{(k-1,i)},$$

where $x_{(k,i)}$ is a "smoothed" tone i magnitude squared at a time k;

$x_{(k-1,i)}$ is a "smoothed" tone i magnitude squared at a time k−1;

$y_{(k,i)}$ is a complex tone i at time k;

$y_{(k-1,i)}$ is a complex tone i at time k−1; and $\alpha$ is a "smoothing" constant (or "forgetting factor")<1.

Continuing with the method in FIG. 8B via connector 816, complex conjugate multiplication between the first and the second sets of tone values is performed to generate a plurality of conjugated values (step 818). Mathematically, the cross correlation maybe described by $$Z_{\{A,B\}-TA} T_B{}^*$$

where $T_A$ and $T_B$ are tones (pilot and traffic tones) within the A and B intervals (see FIG. 6); and $Z_{[A, B]}$ is an N-long array of multiplication products where N is the number of tone bins within each interval.

Next, the absolute value is taken for each of the conjugated values (step 820), i.e., the absolute value of each element of $Z_{[A,B]}$. A maximum value from the results is identified (step 822). Receiver frequency is then adjusted based on a location of the maximum value relative to a predetermined pilot tone location (step 824). More particularly, the frequency adjustment in step 824 is based on a difference between the maximum value location and the predetermined pilot location. The receiver frequency is shifted by a difference in tone bin locations between the tone bin corresponding to the maximum value and the tone bin corresponding to the pilot tone reference. The method ends after step 824, but could be repeated using next first and second sets of tone values (step 826).

Thus, a simple means of suppressing traffic tones is performed by applying the correlation on power spectra computed using phase-differentials of FFT outputs. By applying this process, magnitudes of traffic tones end up being small relative to the pilot tones in order to reduce false correlation peaks. Multiplying the current set of pilot tones with the complex conjugate of the previous slot's pilot tones eliminates time-constant phases in the pilot tones. Only phases that vary in time are left in the results. For the pilot tones, the time-varying phases are predominantly due to frequency error, which results in a constant phase difference from timeslot to timeslot. Traffic tones will experience varying phase difference between timeslots and average out to values small. relative to those of the pilot tones.

Referring back to FIG. 7, a block diagram representation of functional components for use in obtaining frequency synchronization is shown. These functional components are associated with the coarse frequency correction process and the methods described in relation to FIGS. 8A and 8B. The functional components are shown organized in three sections: a functional block 702, a functional block 704, and a functional block 706. Functional block 702 includes a complex conjugate multiplication function 710 (e.g., steps 802–812 of FIG. 8A) and an averaging function 716. In the embodiment shown, complex conjugate multiplication function 710 includes a multiplication function, a delay function, and a conjugation function. Functional block 702 is operative so that complex conjugate multiplication is performed between received tone values from a current time slot at a line 708 and received tone values from a previous time slot. A set of conjugated values is output at a point 712, and a number of these results are averaged by averaging function 716.

Functional block 704 has a complex conjugation function 718 which operates so that complex conjugate multiplication is performed between a lower edge of the frequency band of interest (e.g., frequency alignment range 602 of FIG. 6) and an upper edge of the frequency band of interest (e.g., frequency alignment range 604 of FIG. 6). More particularly, complex conjugate multiplication is performed between tone values from a set of tone bins assigned to the lower frequency alignment range and tone values from a set of tone bins assigned to the upper frequency alignment range. Functional component block 706 includes a magnitude function 720, which computes the absolute value of the output values of functional component block 704. The output of magnitude function 720 is coupled to a peak locator function 722, which identifies or locates the maximum value or peak from the output values of magnitude function 720. An output 724 of peak locator function 722 is utilized to shift frequency according to the relative location of the identified peak. More specifically, receiver frequency will be shifted by a difference in tone bin locations between the tone bin corresponding to the maximum value and the tone bin corresponding to the pilot tone reference.

Figure 9:
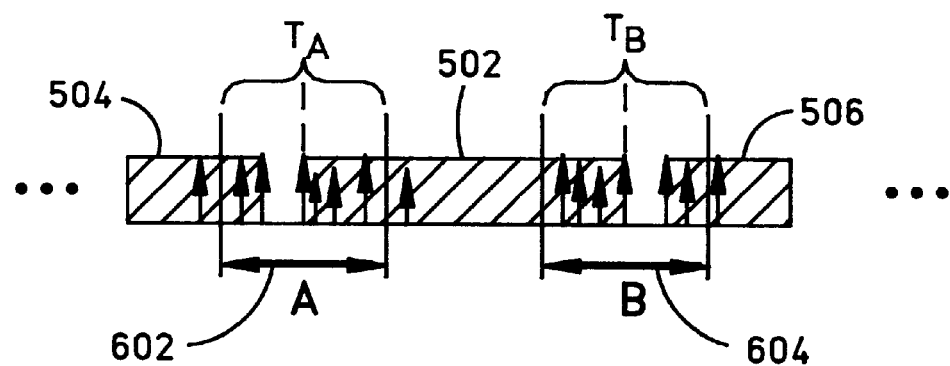
FIGS. 9 and 10 show an illustrative example of the application of the coarse frequency correction process where no frequency error exists.
Figure 10:
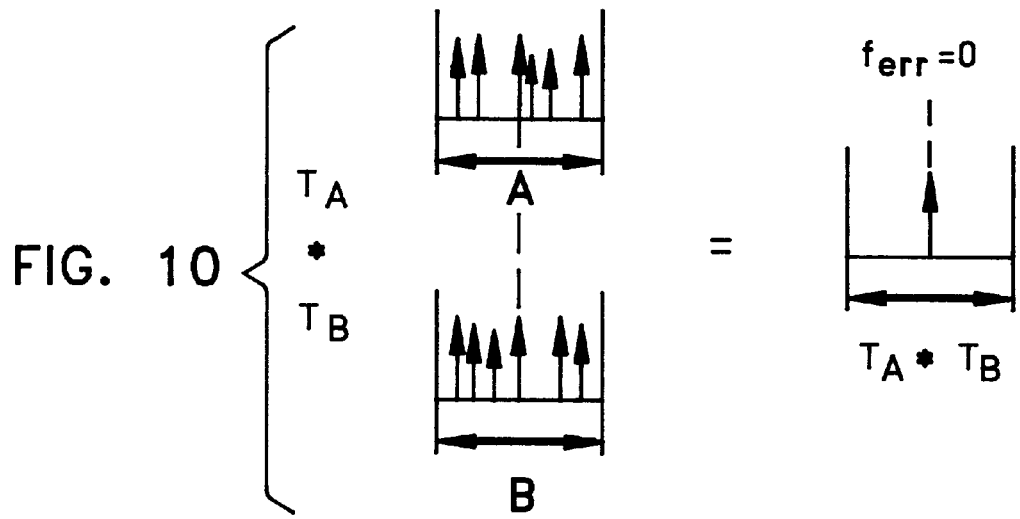

FIG. 9 is an illustrative representation of the sets of frequency bands and the frequency alignment ranges in a case where frequency error in excess of a single tone bin does not exist. As shown in FIG. 9, a pilot tone reference is located in a center of each one of the lower and upper frequency alignment ranges. FIG. 10 is associated with FIG. 9 and shows results of the complex conjugate multiplication between the lower and upper frequency alignment ranges. As shown in FIGS. 9 and 10, the pilot tone reference aligns with the outermost received pilot tone within, the frequency band of interest.

Figure 11:
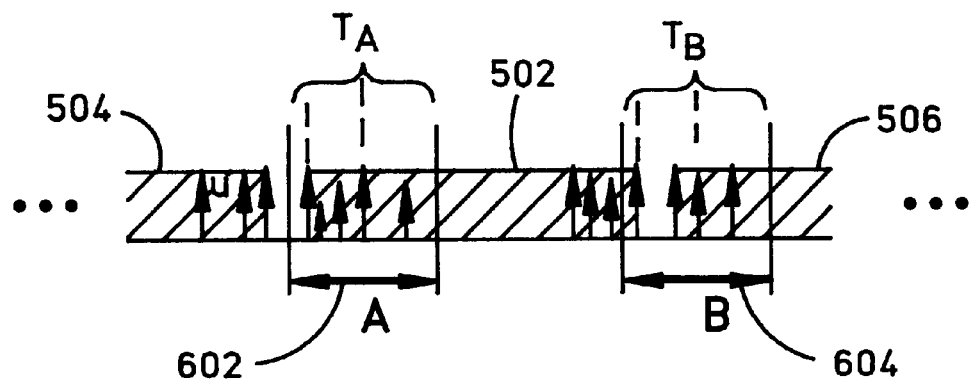
FIGS. 11 and 12 show an illustrative example of the application of the coarse frequency correction process where frequency error does exist.
Figure 12:
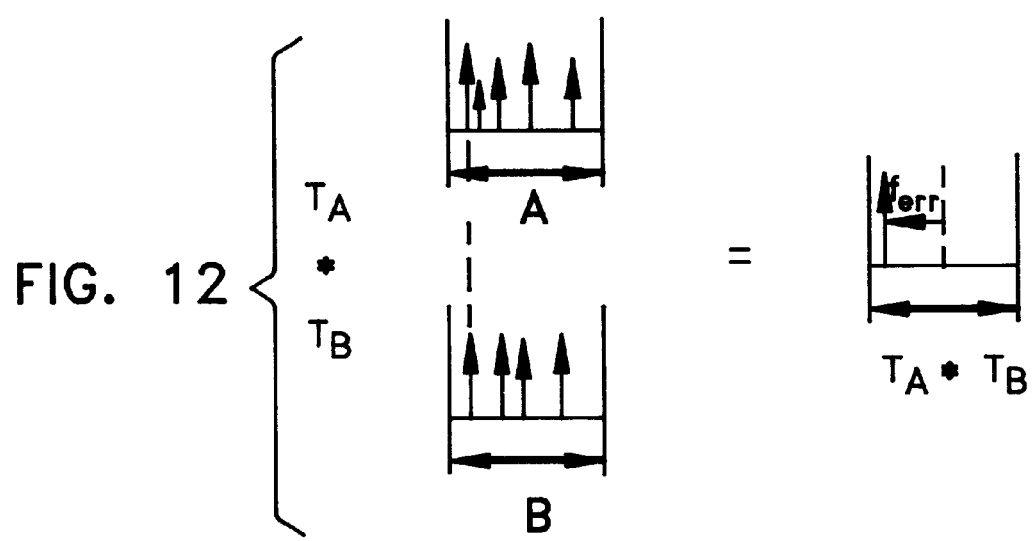

FIG. 11 is an illustrative representation of the sets of frequency bands and the frequency alignment ranges in the case where frequency error in excess of a single tone bin does exist. FIG. 12 is associated with FIG. 11 and shows results of the complex conjugate multiplication between the lower and upper frequency alignment ranges. As shown in FIGS. 11 and 12, the pilot tone reference does not align with the outermost received pilot tones within the frequency band of interest. Frequency is shifted according to a relative location of the identified peak. That is, the tone bin assignment will shift by a difference in tone bin locations between the tone bin corresponding to the maximum value and the tone bin corresponding to the pilot tone reference. Thus, frequency error is reduced to within a single tone bin.

Thus, a coarse frequency synchronization process with several advantages has been described. Channel equalization and compensation processes are not required in the receiver for purposes of frequency synchronization. The method is simple in concept and in realization: it requires relatively few arithmetic calculations, which is an important consideration when using fixed-point DSPs. In a typical application of correlation, sidelobes due to the uniform spacing of embedded pilots lead to multiple peaks which can make identification of frequency error difficult, and this problem is exacerbated when the frequency band of interest has adjacent frequency bands. On the other hand, the method described herein is reliable because it results in a single peak. No template for correlation is required, nor is a priori information such as the spacing between pilot tones needed.

Figure 13:
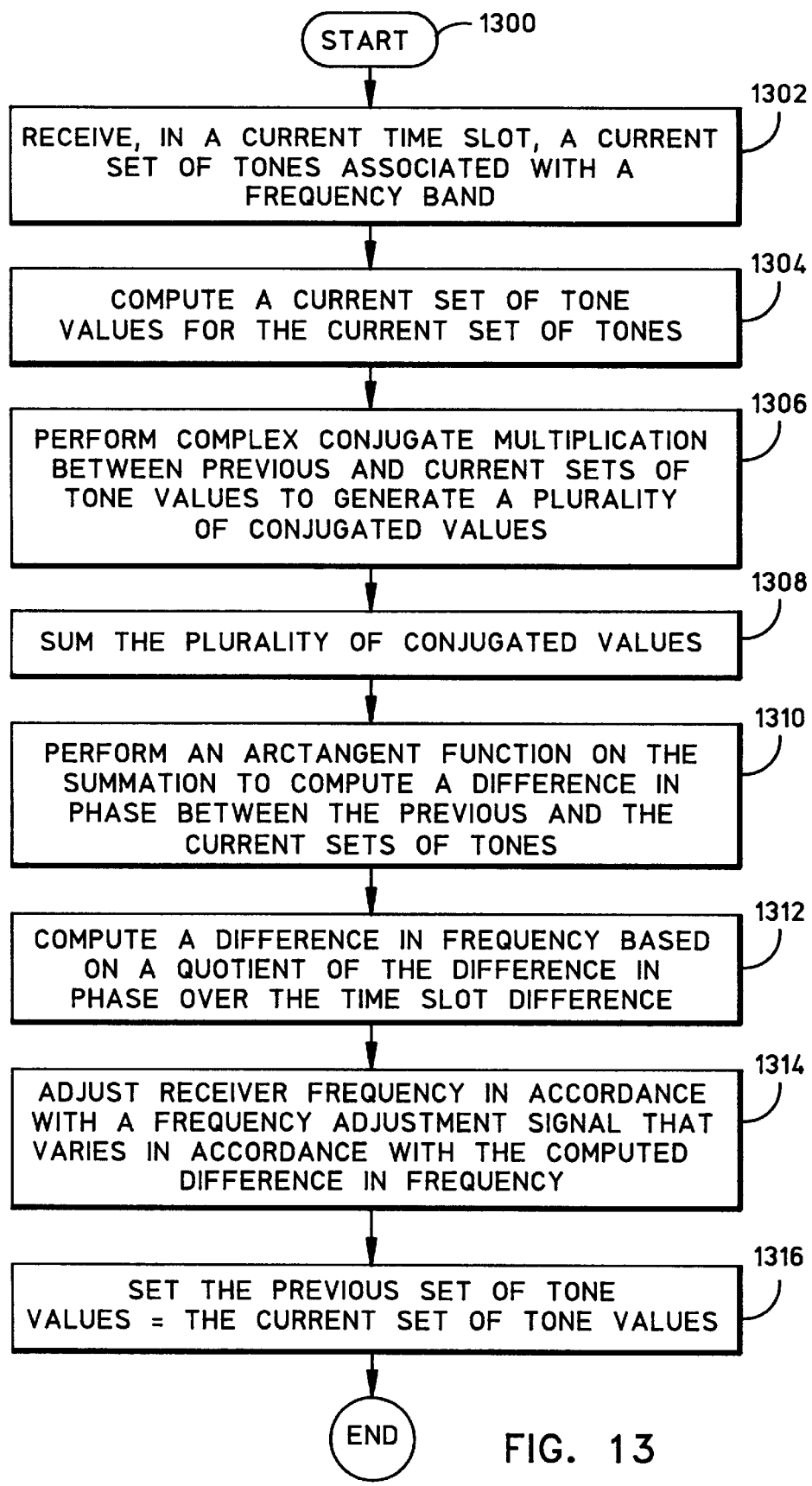
FIG. 13 is a flowchart describing a method for use in obtaining frequency synchronization and, more particularly, a fine frequency correction process.
Figure 14:
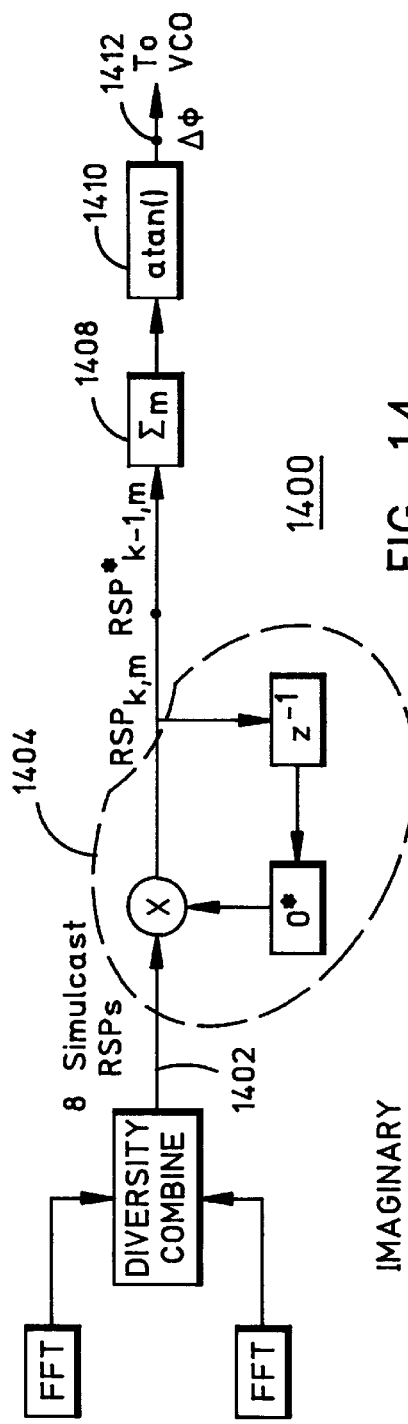
FIG. 14 is a block diagram representation of functional components for use in the fine frequency correction process.
Figure 15:
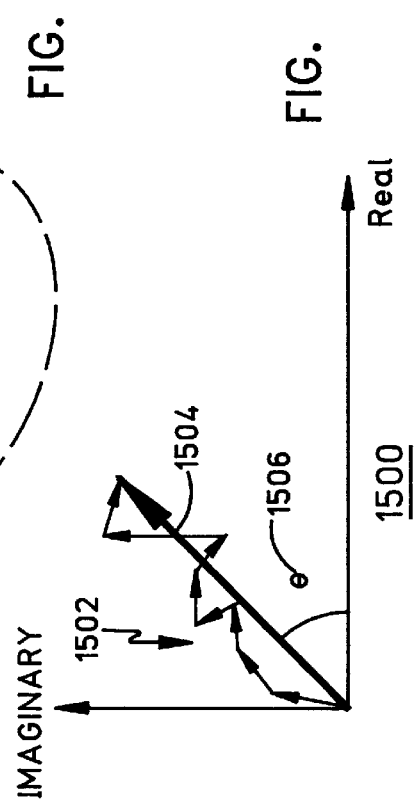
FIG. 15 is a graph showing an example of processing related to a summation function in the fine frequency correction process.

FIGS. 13–15 are drawings that relate to a fine frequency correction process. This fine frequency correction process may be referred to as a phase-differential frequency correction process. The fine frequency correction process is operative to adjust receiver frequency so that the pilot tone signal is substantially aligned with a pilot tone reference within the predetermined frequency range. More particularly, this method is capable of estimating a frequency error of less than or equal to one-half of an FFT tone bin.

Referring more particularly to FIG. 13, a flowchart describing a method for use in obtaining frequency synchronization in an OFDM communication is shown. This method makes use of all eight simulcast tones 302 described in relation to FIG. 3. Beginning at a start block 1300 of FIG. 13, a current set of tones from a current time slot is received (step 1302). A current set of tone values is computed for the current set of tones (step 1304) and stored in a set of tone bins associated with the frequency band of interest (e.g., frequency band 502 of FIG. 5). Next, complex conjugation is performed between the current set of tone values and a previous set of tone values to generate a plurality of conjugated values (step 1306). The previous set of tone values are tone values that were computed from tones of the frequency band of interest received in a previous time slot. The current and the previous sets of tones received include the simulcast pilot tones (e.g., simulcast pilot tones 302 of FIG. 3) in the frequency band of interest for the current and the previous time slots.

The plurality of conjugated values from the complex conjugate multiplication is summed (step 1308) and an arctangent function on the sum is performed to compute a difference in phase between the current and the previous sets of tones (step 1310). A difference in frequency is then computed based on a quotient of the difference in phase over a difference in time between the time slots (step 1312). A frequency adjustment signal is then varied in accordance with the computed difference in frequency, and receiver frequency is adjusted in accordance with the frequency adjustment signal (step 1314). The method ends after step 1314. Preferably, averaging is performed over a period of time using multiple values in step 1306 (on results of the complex conjugation, where new tone values are used as in step 1316) or using multiple values in step 1308 (on results of the summation).

FIG. 14 is an illustrative representation of functional components related to the method described in relation to FIG. 13. Functional block 1404 includes a multiplication function, a delay function, and a conjugation function, which are functionally connected to perform the complex conjugate multiplication between a set of pilot tone values in the current time slot and the set of pilot tone values from the previous time slot. As shown in this embodiment, the eight simulcast pilot tones are input at line 1402 to functional block 1404 for such processing. The results from functional block 1404 are fed into a summation function 1408, and the results from the summation are fed into an arctangent function 1410. The frequency adjustment signal is provided at an output 1412 of arctangent function 1410. Preferably, averaging is performed with an averaging function over a period of time using multiple values from functional block 1404 (on results of the complex conjugation) or using multiple values from functional block 1408 (on results of the summation).

A graph 1500 of FIG. 15 illustrates an example of processing related to summation function 1408 of FIG. 14. Each vector of a plurality of vectors 1502 represents a vector sum of a single pilot tone (conjugated as described) with a running cumulative sum of other pilot tones (conjugated as described). The sum of the plurality of vectors 1502 results in a final vector 1504, which represents the final vector summation. An angle 1506 of final vector 1504 is found by performing an arctangent function on final vector 1504. Angle 1506 is the difference in phase between the sets of tones. The difference in frequency can be computed in a number of ways and is based on a quotient of the difference in phase over the difference in time between time slots of the received tones.

Alternatively, the method may involve performing an arctangent function on each one of the plurality of conjugated values, and averaging results from performing the arctangent function on each one of the conjugated values to compute the difference in phase. Also alternatively, the method may involve weighting each of the plurality of conjugated values with a signal-to-noise ratio (SNR) associated therewith, and summing the plurality of weighted conjugated values to compute the results of the complex conjugate multiplication used in performing the arctangent function.

As described in the fine frequency correction process of FIGS. 13–16, the pilot phase change between successive bursts as a function of time yields a frequency estimate. Consider an RSP represented by $RSP(f_k, t_0) = A_k e^{j\theta(t0)}$ at time $t_0$ and by $RSP(f_k, t_1) = A_k e^{j\theta(t1)}$ at time $t_1$. Here, $A_k$ is the complex FFT bin value at frequency k and θ is the time-varying phase error. The frequency error $\omega_e$ can be computed as the difference of the phase angles of the tones divided by $t_1-t_0$, represented simply as $$\omega_e = (\theta_{t1} - \theta_{t0})/(t_1 - t_0).$$

In the preferred embodiment, the time interval is the burst transmit period, $t_1-t_0 = 375$ microseconds, where an OFDM packet time comprises 320 microseconds and a guard time comprises 55 microseconds. The above equation for $\omega_e$ is, however, only valid when the frequency error is less than the Nyquist sampling rate. If the frequency error is greater than the Nyquist frequency, aliasing of the estimate occurs. In the embodiment described, the phase is sampled with a frequency of $1/375 \times 10^{-6}$ Hz and therefore $f_{NYQUIST} = 1/(2*375 \times 10^{-6}) = 1333$ Hz. To resolve the frequency ambiguity in the event the actual frequency error exceeds the 1333 Hz Nyquist frequency, the method described in relation to FIGS. 17 and 18 is employed (described below).

Figure 17:
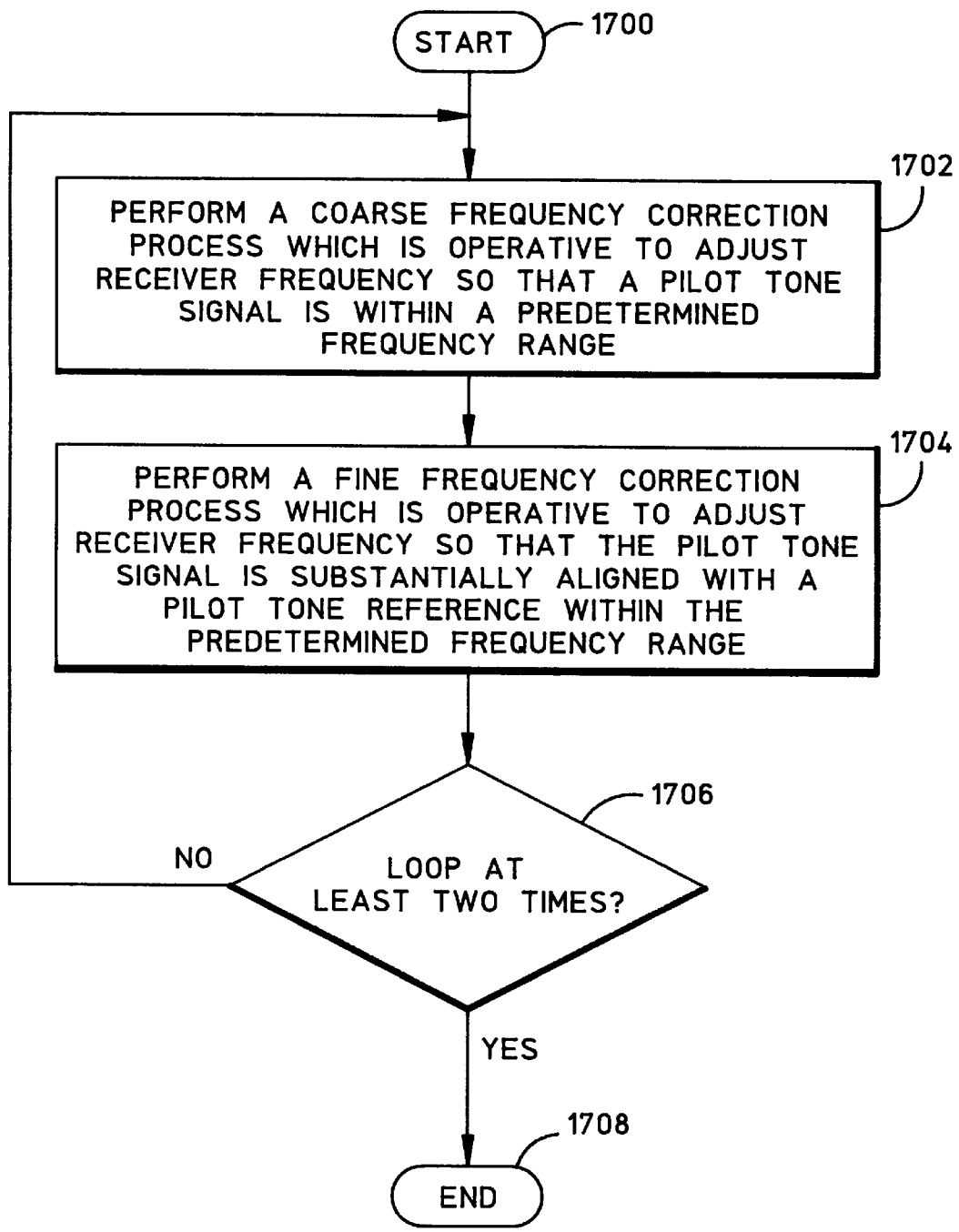
FIG. 17 is a flowchart describing a method for use in obtaining frequency synchronization, which preferably includes the coarse and the fine frequency correction processes described herein.

FIG. 17 is a flowchart describing another method for use in obtaining frequency synchronization in an OFDM communication system. This method makes use of both coarse and fine frequency correction processes in an iterative fashion. Beginning at a start block 1700, a coarse frequency correction process is performed (step 1702). The coarse frequency correction process is operative to adjust receiver frequency so that a pilot tone signal is within a predetermined frequency range. Preferably, the predetermined frequency range corresponds to a single FFT tone bin. After performing the coarse frequency correction process, a fine frequency correction process is performed (step 1704). The fine frequency correction process is operative to adjust receiver frequency so that the pilot tone signal is substantially aligned with a pilot tone reference within the predetermined frequency range. Preferably, the frequency error is reduced by the fine frequency correction process to be less than or equal to one-half of a single FFT tone bin.

From performing the coarse frequency correction process in step 1702, receiver frequency is adjusted so that the pilot tone signal is within the predetermined frequency range. However, because the Nyquist sampling frequency range within the predetermined frequency range gives rise to a phase ambiguity, the determined pilot tone location may be incorrect. This pilot tone may be considered an "aliased" pilot tone. An example illustration of this condition is shown in FIG. 18A. FIG. 18A shows a predetermined frequency range 1802 corresponding, to a tone bin width, a Nyquist sampling frequency range 1804 within predetermined frequency range 1802, a pilot tone reference 1806 corresponding to a center of predetermined frequency range 1806, a pilot tone signal 1808 within predetermined frequency range 1802 but outside Nyquist sampling frequency range 1804, and an alias pilot tone signal 1810 within both predetermined frequency range 1802 and Nyquist sampling frequency range 1804. Due to such a condition, from performing the fine frequency correction process in step 1704, receiver frequency is actually adjusted so that the alias pilot tone signal is substantially aligned with the pilot tone reference and the pilot tone signal is shifted outside the predetermined frequency range. This is an, undesirable condition. An example illustration of this undesirable condition is shown in FIG. 18B, which is based on the condition in FIG. 18A. Note how the tone placement relative to the reference frequency is now 2×1333 Hz=2666 Hz away.

To eliminate any such condition, additional steps are performed as further described in relation to FIG. 17. After performing the coarse and the fine frequency correction processes in steps 1702 and 1704, the coarse frequency correction process is performed again (step 1702) after determining that a second iteration needs to be performed (step 1706). After performing the, coarse frequency correction process again, the fine frequency correction process is performed again (step 1704). From performing the coarse frequency correction process again in step 1702, receiver frequency is adjusted so that the pilot tone signal is within both the predetermined frequency range and the Nyquist sampling frequency range. An example of this condition is shown in FIG. 18C, which is based on the condition shown in FIG. 18B. Note that the tone is now within 3125 Hz−(2*1333 Hz)=459 Hz from the reference position, well within the range of the fine frequency correction process. From performing the fine frequency correction process again in step 1704, receiver frequency is adjusted so that the pilot tone signal is substantially aligned with the pilot tone reference. An example of the desired result is shown in FIG. 18D, which is based on the condition shown in FIG. 18C. Here, the frequency error is reduced to less than one-half of a tone bin.

Correct frequency synchronization is thereby achieved by the iterative processing of FIG. 17. The processes in steps 1702 and 1704 may be repeated as many times as necessary or desired for frequency synchronization. Although other suitable coarse and fine correction processes may be utilized, the coarse frequency correction process is preferably that process described in relation to FIGS. 6–12 and the fine frequency correction process is preferably that process described in relation to FIGS. 13–16.

Figure 16:
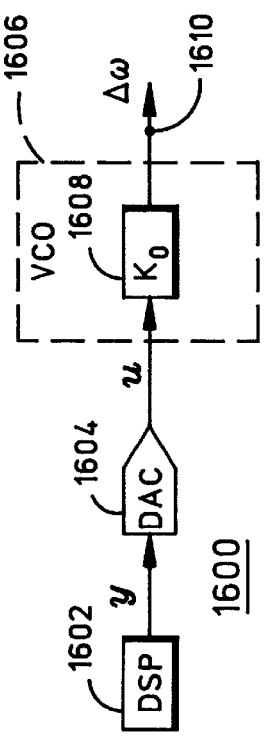
FIG. 16 is a schematic block diagram of a digital signal processing, apparatus for use in frequency synchronization.

Referring back to. FIG. 16, a schematic block diagram of a digital signal processing apparatus 1600 is shown. Digital signal processing apparatus 1600 may be referred to as a frequency control device, and is used in connection with the inventive methods described herein. The digital signal processing apparatus 1600 includes a digital signal processor (DSP) 1602, a digital-to-analog converter (DAC) 1604, and a voltage-controlled oscillator (VCO) 1606. As apparent, DSP 1602 executes many of the method steps described herein with processor instructions embedded in memory. DSP 1602 has an output coupled to an input of DAC 1604, which has an output coupled to an input of VCO 1606. In the embodiment shown, DSP 1602 feeds a digital data signal (i.e., a digital value) to is DAC 1604. DAC 1604 converts the digital data signal to an analog signal, which is fed to the input of VCO 1604. The voltage level at the input of VCO 1604 determines the frequency of an analog signal generated by VCO 1606 at an output 1610. Preferably, VCO 1606 is a 32 MHz VCXO.

More specifically, frequency error estimates are generated and DSP 1602 makes a corrective change to VCO 1606, which changes the appropriate RF and intermediate frequencies (IF). The VCO frequency operating point is changed by altering its voltage input, which is generated when DSP 1602 writes a value y to DAC 1604. The VCO frequency change Δω is modeled by $$\Delta\omega = uK_0$$

where u is the input control voltage to VCO 1606 and $K_0$ is a gain factor 1608 of VCO 1606. The value of u is determined by y which is computed in DSP 1602. Conversion from the digital domain (y) to the analog domain (u) is achieved through a scaling factor $\beta$, which maps the computed digital value within the voltage range of DAC 1604. The DAC scaling factor is $\beta=2^{15}/4.64$ volts; i.e., the DAC outputs a maximum voltage of 4.64 volts for a corresponding input value of $2^{15}$. The value that is written to the DAC 1604 is based on $$y=(\Delta\omega\beta)/(MK_o)$$

where $\Delta\omega$ is the estimated frequency error computed by the phase detector, and M is the RF multiplication factor corresponding to the gain required to amplify the VCO frequency change at 32 MHz to the corresponding change in RF frequencies. The value of M depends on the frequency plan, but is approximately equal to 60 in the preferred embodiment.

Thus, the methods described herein involve the use of a coarse frequency correction process, a fine frequency correction process, and an overarching iterative process that makes use of both the coarse and fine frequency correction processes. The coarse frequency correction process involves the steps of generating a plurality of tone values for a plurality of tone bins, where the plurality of tone bins include a first set of tone bins assigned to a first frequency range and a second set of tone bins assigned to a second frequency range; performing complex conjugate multiplication between the tone values of the first and the second sets of tone bins; identifying a maximum value from results of the complex conjugate multiplication; and shifting receiver frequency based on a location of the maximum value relative to a predetermined pilot tone location. In this method, the first frequency range corresponds to a lower edge portion of a frequency band of interest, an upper edge portion of a lower adjacent frequency band, and a lower guard band in between the lower and the upper edge portions; and the second frequency range corresponds to an upper edge portion of the frequency band of interest, a lower edge portion of an upper adjacent frequency band, and an upper guard band: in between the upper and lower edge portions.

The coarse frequency correction process may further involve shifting receiver frequency based on a difference between the location of the maximum value and the predetermined pilot tone location. In addition, the coarse frequency correction process may further involve taking absolute values of results from the complex conjugate multiplication to thereby provide the results used in identifying the maximum value. To ensure a single peak for frequency correction, the generating of the plurality of tone values for the plurality of tone bins may involve generating a first set of tone values based on tones received in a current time slot; retrieving a second set of tone values that were previously generated based on tones received in a previous time slot; and performing complex conjugate multiplication between the first and the second sets of tone values generated from the previous and current time slots to thereby suppress tones that vary in phase over time. In addition, the generating of the plurality of tone values for the plurality of tone bins may further involve repeating the generating of the first and the second sets of tone values and the performing of complex conjugate multiplication between the first and the second sets of tone values for additional previous and current time slots; and averaging results of the repeated generating and performing of complex conjugate multiplication between the first and the second sets of tone values.

The fine frequency correction process involves the steps of receiving, in a first time slot, a first set of tones associated with a frequency range; computing a first set of tone values based on the first set of tones; receiving, in a second time slot, a second set of tones associated with the frequency range, the first and the second time slots being separated by a difference in time; computing a second set of tone values based on the second set of tones; performing complex conjugate multiplication between the first and the second set of tone values; performing an arctangent function on results from the; complex conjugate multiplication to compute a difference in phase between the first and the second set of tones; and computing a difference in frequency based on a quotient of the difference in phase over the difference in time. The fine frequency correction process may further involve the steps of varying a frequency adjustment signal in accordance with the computed difference in frequency, and adjusting receiver frequency in accordance with the frequency adjustment signal.

In addition, the method may further involve summing a plurality of conjugated values to thereby provide the results from the complex conjugate multiplication used in performing the arctangent function. On the other hand, the method may further involve performing an arctangent function on each one of a plurality of conjugated values; and averaging results from performing the arctangent function on each one of the conjugated values to thereby compute the difference in phase. Also alternatively, the method may involve weighting each of a plurality of conjugated values with a signal-to-noise ratio (SNR) associated therewith; and summing the plurality of weighted conjugated values to compute the results of the complex conjugate multiplication used in performing the arctangent function.

The overarching iterative process involves both the coarse and fine frequency correction processes. The iterative method includes the steps of performing a coarse frequency correction process which is operative to adjust receiver frequency so that a pilot tone signal is within a predetermined frequency range and, after performing the coarse frequency correction process, performing a fine frequency correction process which is operative to adjust receiver frequency so that the pilot tone signal is substantially aligned with a pilot tone reference within the predetermined frequency range. From performing the coarse frequency correction process, receiver frequency is adjusted so that the pilot tone signal is within the predetermined frequency range. However, the pilot tone signal ma be outside a Nyquist sampling frequency range which undesirably causes an alias pilot tone signal to be within the Nyquist sampling frequency range. Assuming this condition, from performing the fine frequency correction process, receiver frequency is adjusted so that the alias pilot tone signal is substantially aligned with the pilot tone reference and the pilot tone signal is undesirably shifted outside the predetermined frequency range.

The iterative processing eliminates any such result by, after performing the coarse and the fine frequency correction processes, performing the coarse frequency correction process again and, after performing the coarse frequency correction process again, performing the fine frequency correction process again. From performing the coarse frequency correction process again, receiver frequency is adjusted so that the pilot tone signal is within both the predetermined frequency range and the Nyquist sampling frequency range. From performing the fine frequency correction process again, receiver frequency is adjusted so that the pilot tone signal is substantially aligned with the pilot tone reference.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A method for use in obtaining frequency synchronization in an Orthogonal Frequency Division Multiplexed (OFDM) communication system, the method comprising:

receiving OFDM communication signals;

generating, from the received OFDM communication signals, a plurality of tone values for a plurality of tone bins, the plurality of tone bins including a first set of tone bins assigned to a first frequency range and a second set of tone bins assigned to a second frequency range, the first and second frequency ranges corresponding to lower and upper edge portions of a frequency band of interest;

performing complex conjugate multiplication between the tone values of the first and the second sets of tone bins;

identifying a maximum value from results of the complex conjugate multiplication; and shifting receiver frequency based on a location of the maximum value relative to a predetermined pilot tone location for synchronizing with the frequency band of interest.

2. The method according to claim 1, wherein shifting the receiver frequency comprises:

adjusting an input voltage of a voltage-controlled oscillator (VCO) based on a difference between the location of the maximum value and the predetermined pilot tone location.

3. The method according to claim 1, further comprising:

taking absolute values of results from the complex conjugate multiplication to thereby provide the results used in identifying the maximum value.

4. The method according to claim 1, wherein generating the plurality of tone values for the plurality of tone bins comprises:

generating a first set of tone values based on tones received in a current time slot;

retrieving a second set of tone values that were previously generated based on tones received in a previous time slot; and performing complex conjugate multiplication between the first and the second sets of tone values generated from the previous and current time slots, thereby suppressing tones that vary in phase over time.

5. The method according to claim 4, wherein generating the plurality of tone values for the plurality of tone bins further comprises:

repeating the generating of first and second sets of tone values and the performing of complex conjugate multiplication between first and second sets of tone values for additional previous and current time slots; and averaging results of the repeated generating of first and second sets of tone values and performing of complex conjugate multiplication between first and second sets of tone values.

6. The method according to claim 1, wherein the first frequency range corresponds to a lower edge portion of the frequency band of interest, an upper edge portion of a lower adjacent frequency band, and a lower guard band in between the lower and the upper edge portions, and the second frequency range corresponds to an upper edge portion of the frequency band of interest, a lower edge portion of an upper adjacent frequency band, and an upper guard band in between the upper and lower edge portions.

7. The method according to claim 1, wherein the first and the second frequency ranges are equal in size and have centers that are spaced in frequency equal to the bandwidth of the frequency band of interest.

8. A digital signal processing apparatus for use in obtaining frequency synchronization in an Orthogonal Frequency Division Multiplexed (OFDM) communication system, the digital signal processing apparatus comprising:

memory;

processor instructions embedded in said memory and executable for:

generating, from received OFDM communication signals, a plurality of tone values for a plurality of tone bins, the plurality of tone bins including a first set of tone bins assigned to a first frequency range and a second set of tone bins assigned to a second frequency range, the first and second frequency ranges corresponding to upper and lower edges of a frequency band of interest;

performing complex conjugate multiplication between the tone values of the first and the second sets of tone bins;

identifying a maximum value from results of the complex conjugate multiplication; and shifting receiver frequency based on a location of the maximum value relative to a predetermined pilot tone location for synchronizing with the frequency band of interest.

9. The digital signal processing apparatus according to claim 8, wherein for shifting the receiver frequency, said processor instructions are further executable for:

adjusting an input voltage of a voltage-controlled oscillator (VCO) based on a difference between the location of the maximum value and the predetermined pilot tone location.

10. The digital signal processing apparatus according to claim 8 wherein said processor instructions are further executable for:

taking absolute values of results from the complex conjugate multiplication to thereby provide the results used in identifying the maximum value.

11. The digital signal processing apparatus according to claim 8, wherein for generating the plurality of tone values for the plurality of tone bins, said processor instructions are further executable for:

generating a first set of tone values based on tones received in a current time slot;

retrieving a second set of tone values that were previously generated based on tones received in a previous time slot; and performing complex conjugate multiplication between the first and the second sets of tone values generated from the previous and current time slots, thereby suppressing tones that vary in phase over time.

12. The digital signal processing apparatus according to claim 11, wherein for generating the plurality of tone values for the plurality of tone bins, said processor instructions are further executable for:

repeating, for additional previous and current time slots, the generating of first and second sets of tone values and the performing of complex conjugate multiplication between first and second sets of tone values; and averaging results of the repeated generating and performing.

13. The digital signal processing apparatus according to claim 8, wherein the first frequency range corresponds to a lower edge portion of a frequency band of interest, an upper edge portion of a lower adjacent frequency band, and a lower guard band in between the lower and the upper edge portions, and wherein the second frequency range corresponds to an upper edge portion of the frequency band of interest, a lower edge portion of an upper adjacent frequency band, and an upper guard band in between the upper and lower edge portions.

14. The digital signal processing apparatus according to claim 8, wherein the frequency spacing of the lower and upper guard bands is different from the frequency spacing between adjacent pilot tones.

15. A receiver unit, comprising:
  a wireless receiver operative to receive Orthogonal Frequency Division Multiplexed (OFDM) communication signals;
  a digital signal processing apparatus coupled to said wireless receiver;
  said digital signal processing apparatus for:
    generating, from the received OFDM communication signals, a plurality of tone values for a plurality of tone bins, the plurality of tone bins including a first set of tone bins assigned to a first frequency range and a second set of tone bins assigned to a second frequency range, the first and second frequency ranges corresponding to upper and lower edges of a frequency band of interest;
  performing complex conjugate multiplication between the tone values of the first and the second sets of tone bins;
    identifying a maximum value from results of the complex conjugate multiplication; and
    shifting receiver frequency based on a location of the maximum value relative to a predetermined pilot tone location for synchronizing with the frequency band of interest.

16. The receiver unit according to claim 15, wherein said digital signal processing apparatus is for taking absolute values of results from the complex conjugate multiplication to thereby provide the results used in identifying the maximum value.

17. The receiver unit according to claim 15, wherein for shifting the receiver frequency, said digital signal processing apparatus is utilized for adjusting an input voltage of a voltage-controlled oscillator (VCO) based on a difference between the location of the maximum value and the predetermined pilot tone location.

18. The receiver unit according to claim 15, wherein for generating the plurality of tone values for the plurality of tone bins, said digital signal processing apparatus is further utilized for:

generating a first set of tone values based on tones received in a current time slot;
  retrieving a second set of tone values that were previously generated based on tones received in a previous time slot; and
  performing complex conjugate multiplication between the first and second sets of tone values generated from the previous and current time slots, thereby suppressing tones of that vary in phase over time.

19. The receiver unit according to claim 15, wherein for generating the plurality of tone values for the plurality of tone bins, said digital signal processing apparatus is further executable for:
  repeating, for additional previous and current time slots, the generating of first and second sets of tone values and the performing of complex conjugate multiplication between first and second sets of tone values; and
  averaging results of the repeated generating and performing.

20. A method for use in obtaining frequency synchronization in a multicarrier modulated system utilizing a frequency band of orthogonal narrowband carriers, the method comprising:
  generating a plurality of tone values for a plurality of tone bins, the plurality of tone bins including a first set of tone bins assigned to a first frequency range and a second set of tone bins assigned to a second frequency range, the first and the second frequency ranges corresponding to lower and upper edge portions of a frequency band of interest;
  wherein the generating is performed by averaging the results from a repeated performance of the following steps:
    generating a first set of tone values from tones received in a current time slot;
    retrieving a second set of tone values that were previously generated based on tones received in a previous time slot;
    performing complex conjugate multiplication between the first and second sets of tone values generated from the previous and current time slots, thereby suppressing tones of that vary in phase over time;
  performing complex conjugate multiplication between the tone values of the first and the second sets of tone bins;
  identifying a maximum value from results of the complex conjugate multiplication; and
  shifting receiver frequency based on a location of the maximum value relative to a predetermined pilot tone location for synchronizing with the frequency band of interest.

* * * * *